US006925216B2

(12) United States Patent
Vernon et al.

(10) Patent No.: US 6,925,216 B2
(45) Date of Patent: Aug. 2, 2005

(54) DIRECT-PATTERNED OPTICAL WAVEGUIDES ON AMORPHOUS SILICON FILMS

(75) Inventors: Steve Vernon, Pleasanton, CA (US); Tiziana C. Bond, Livermore, CA (US); Steven W. Bond, Livermore, CA (US); Michael D. Pocha, Livermore, CA (US); Stefan Hau-Riege, Fremont, CA (US)

(73) Assignee: The Regents of the University of California, Oakland, CA (US)

( * ) Notice: Subject to any disclaimer, the term of this patent is extended or adjusted under 35 U.S.C. 154(b) by 111 days.

(21) Appl. No.: 10/676,876

(22) Filed: Sep. 30, 2003

(65) Prior Publication Data

US 2004/0240821 A1 Dec. 2, 2004

Related U.S. Application Data

(60) Provisional application No. 60/475,213, filed on May 30, 2003.

(51) Int. Cl.[7] ............................. G02B 6/12; H01L 21/00
(52) U.S. Cl. ........................ 385/14; 385/129; 385/130; 385/131; 385/141; 438/29; 438/31
(58) Field of Search ........................ 385/14, 129, 130, 385/131, 132, 141; 438/29, 31, 36, 38, 166

(56) References Cited

U.S. PATENT DOCUMENTS

| 4,534,820 A | * | 8/1985 | Mori et al. ................... 117/58 |
| 5,298,787 A | * | 3/1994 | Bozler et al. ................ 257/592 |
| 5,354,709 A | | 10/1994 | Lorenzo et al. ............. 437/129 |
| 5,841,931 A | | 11/1998 | Foresi et al. ................ 385/131 |
| 5,946,562 A | * | 8/1999 | Kuo ............................ 438/166 |
| 5,968,857 A | * | 10/1999 | Pinckney ..................... 501/10 |
| 6,204,099 B1 | | 3/2001 | Kusumoto et al. .......... 438/151 |
| 6,303,945 B1 | * | 10/2001 | Saito et al. ................... 257/64 |
| 6,635,899 B2 | * | 10/2003 | Saito et al. ................... 257/64 |
| 6,670,599 B2 | * | 12/2003 | Wagner et al. ........... 250/214.1 |
| 2002/0145139 A1 | * | 10/2002 | Wagner et al. ............... 257/53 |
| 2003/0196996 A1 | * | 10/2003 | Jennings et al. ....... 219/121.73 |
| 2004/0240821 A1 | * | 12/2004 | Vernon et al. .............. 385/130 |

FOREIGN PATENT DOCUMENTS

EP           0567051 B1    4/1993   ............... 385/14 X

OTHER PUBLICATIONS

Kjartan Faerch et al, Symmetrical Waveguide Devices Fabricated by Direct UV Writing, IEEEE Photoonics Technology Letters., vol. 14, No. 2 Feb. 2002.
C.M. Fortmann et al, Hot–wire deposition of photonic–grade amorphous silicon, Thin Solid Films 395 (2001) 142–146.
Giuseppe Cocorullo et al, Amorphous Silicon–Based Guided–Wave Passive and Active Devices for Silicon Integrated Optoelectronics, IEEE Journal of Selected Topics in Quantum Electronics, vol. 4, No. 6, Nov./Dec. 1998.

(Continued)

*Primary Examiner*—Brian M. Healy
(74) *Attorney, Agent, or Firm*—James S. Tak; Alan H. Thompson; Eddie E. Scott

(57) ABSTRACT

An optical waveguide structure is formed by embedding a core material within a medium of lower refractive index, i.e. the cladding. The optical index of refraction of amorphous silicon (a-Si) and polycrystalline silicon (p-Si), in the wavelength range between about 1.2 and about 1.6 micrometers, differ by up to about 20%, with the amorphous phase having the larger index. Spatially selective laser crystallization of amorphous silicon provides a mechanism for controlling the spatial variation of the refractive index and for surrounding the amorphous regions with crystalline material. In cases where an amorphous silicon film is interposed between layers of low refractive index, for example, a structure comprised of a $SiO_2$ substrate, a Si film and an $SiO_2$ film, the formation of guided wave structures is particularly simple.

33 Claims, 4 Drawing Sheets

OTHER PUBLICATIONS

Michael O. Thompson et al, Melting Temperature and Explosive Crystallization of Amorphous Silicon during Pulsed Laser Irradiation, 1984 The American Physical Society Physical Review Letters vol. 52, No. 26 Jun. 25, 1984 pp. 2360–2364.

Osamu Hanaizumi et al, Propagation of light beams along line defects formed in a–Si/SiO2, 1999 American Institute of Physics Applied Physics Letters vol. 74, No. 6 pp. 777–779.

S.R. Stiffler et al, Supercooling and Nucleation of Silicon after Laser Melting, 1988 The American Physical Society Physical Review Letters vol. 60, No. 24, Jun. 1988 pp. 2523.

Kim et. al., New Excimer–laser–crystallization method for producing large–grained and grain boundary–location–controlled Si films for thin film transistors, Appl Phys. Lett 68 (11) Mar. 11, 1996 pp. 1513–1515.

Minghong Lee et al, Relationship between fluence gradient and lateral grain growth in spatially controlled excimer laser crystallization of amorphous silicon films, Journal of Applied Physics vol. 88 No. 9 Nov. 1, 2000.

Hiroki Takahashi et al, Influence of Ar impurities on optical refractive index of sputter deposited a–Si films, Journal of Materials Research vol. 12, No. 7 Jul. 1997.

M.H.Brodsky et al, Structural, Optical, and Electrical Properties of Amorphous Silicon Films, Physical Review B vol. 1, No. 6 Mar. 15, 1970.

\* cited by examiner

DIRECT-PATTERNED OPTICAL WAVEGUIDES ON AMORPHOUS SILICON FILMS

I. CLAIM OF PRIORITY IN PROVISIONAL APPLICATION

This application claims priority in provisional application filed on May 30, 2003 entitled "Efficient direct writing technique for the patterning of optical waveguides and photonic integrated circuits: novel application of low temperature laser processing to the formation of guided wave structures in amorphous silicon thin films" Ser. No. 60/475,213, by Stephen P. Vernon et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to optical waveguides and fabrication methods thereof, and more particularly to an optical waveguide architecture and a fabrication method in which an amorphous silicon core region and polycrystalline silicon cladding regions are formed from an amorphous silicon layer, with the cladding formed by direct patterned crystallization of selected areas of the a-Si layer.

III. BACKGROUND OF THE INVENTION

The use of amorphous silicon (a-Si) for optical device applications is rapidly expanding as the telecommunications industry increasingly turns to waveguide-based networks to meet increased demand in bandwidth and speed. And in particular, various optical waveguide architectures and fabrication technologies have been developed employing a-Si in the fabrication process to produce optoelectronic devices at a low cost.

For example, in U.S. Pat. No. 5,841,931 to Foresi et al, a method of forming a polycrystalline semiconductor waveguide for optoelectronic integrated circuits is shown having a polycrystalline core layer 14 surrounded by first and second cladding layers 12, 16 (e.g. $SiO_2$). The polycrystalline semiconductor waveguide of Foresi is produced, for example, by depositing a layer of amorphous semiconductor such as a-Si on the first cladding layer, annealing the a-Si into a polycrystalline semiconductor core layer, surface polishing the polycrystalline semiconductor core layer, and deposition forming the second cladding layer on the polished polycrystalline core. The polycrystalline core layer may be patterned as a strip (FIG. 2 of Foresi) by etching the core layer prior to forming the second cladding layer thereon. A similar waveguide architecture and fabrication method is disclosed in U.S. Pat. No. 5,354,709 to Lorenzo et al. having a polycrystalline core annealed from a-Si and etched to form ribs. In Lorenzo, the polycrystalline core is also bounded by $SiO_2$ cladding layers which are deposition formed separately from the core.

As evidenced in the '931 and '709 patents, amorphous silicon is often utilized for the limited purpose of providing a transitional deposition layer to provide fast, economical deposition onto a substrate at low temperatures. Ultimately, however, the a-Si layer is converted into a polycrystalline core layer (e.g.; by annealing) to produce a polycrystalline silicon (p-Si) waveguide having low refractive index layers (e.g. $SiO_2$) cladding the high index p-Si core layer and deposited separately from the core layer. A fundamental problem with p-Si waveguides, however, is that they characteristically exhibit relatively large losses due to a variety of effects, including grain boundary induced optical scatter.

In contrast, waveguides employing amorphous material in the core are known to exhibit reduced scatter and lower loss than polycrystalline silicon (p-Si) waveguides. One example of such a waveguide and fabrication approach is shown in the referenced publication, "Hot-wire deposition of photonic-grade amorphous silicon" by C. M. Fortmann et al. employing hot-wire deposition to form a thin film of amorphous silicon hydride (a-Si:H). The approach relies on the fact that the refractive index of a-Si:H depends on the H concentration, with the refractive index decreasing with increasing hydrogen concentration. Following a-Si deposition, a mask is used to protect selected areas (the core) and the H concentration of the surrounding regions is raised using ion implantation to form the cladding. Apart from the cost and complexity of the process, this approach is problematic in that H diffusion in a-Si is strongly temperature dependent, with modest temperature increases ~100 Celsius producing sufficient interdiffusion to eliminate the H concentration gradients over modest periods of time. Consequently the temperature of these structures must be carefully controlled.

Additionally, amorphous silicon has been extensively investigated as an electronic material, and is the focus of continuous technological developments by the VLSI industry due to its compatibility with CMOS processing. For example, laser re-crystallization is currently used to fabricate polycrystalline thin film transistors (TFT) from a-Si films for active matrix displays. For such applications, it is desirable to convert an a-Si film on a glass substrate into p-Si. This is accomplished by scanning a short wavelength laser across the a-Si film. The duration of the illumination is sufficient that the illuminated portion of the a-Si film is raised to the melting temperature; upon cooling the film adopts a poly-crystalline morphology. Typically, to avoid undo heating of the substrate and surrounding regions, a pulsed laser is utilized (usually an excimer laser operating at 308 nm). The laser fluence and pulse duration are adjusted to perform the recrystallization and minimize local heating.

In summary, it would be advantageous to provide an a-Si waveguide architecture and fabrication technology for optoelectronics applications, whereby waveguides fabricated from pure a-Si could operate over significantly larger temperature ranges and could provide robust, low-cost, high bandwidth, high speed, waveguide-based, network and photonic interconnects for the telecommunication industry.

IV. SUMMARY OF THE INVENTION

One aspect of the present invention includes a method of fabricating an optical waveguide comprising: depositing an amorphous silicon film on a substrate; and crystallizing selected regions of the amorphous silicon film to bound at least one non-selected region of the amorphous silicon film between the crystallized selected regions in alternating arrangement, wherein the crystallization reduces the refractive index of the selected regions below the refractive index of the at least one non-selected region.

Another aspect of the present invention includes a method of direct patterning an optical waveguide from an amorphous silicon film comprising: spatially directing amorphous silicon crystallization means to crystallize selected regions of the amorphous silicon film on opposite sides of at least one non-selected region thereof so as to bound each non-selected region(s) between a pair of said crystallized selected regions in alternating arrangement, wherein said crystallization reduces the refractive index of the selected regions below the refractive index of the non-selected region (s).

Another aspect of the present invention includes an optical waveguide comprising: a monolithic structure having at least one as-deposited amorphous silicon (a-Si) core region, and at least one pair of annealed polycrystalline silicon (p-Si) cladding regions bounding the core layer(s) on opposite sides thereof in alternating arrangement, said p-Si cladding layers having a lower index of refraction than the a-Si core layer(s).

And another aspect of the present invention includes an optical waveguide comprising: a bondless and seamless monolithic thin film structure having n amorphous silicon core region(s) and n+1 crystallized silicon cladding regions laser patterned in alternating arrangement with respect to the amorphous silicon core region(s), with said cladding regions having a lower refractive index than the core region(s).

V. BRIEF DESCRIPTION OF THE DRAWINGS

The accompanying drawings, which are incorporated into and form a part of the disclosure, are as follows.

VI. DETAILED DESCRIPTION

The present invention is generally directed to an optical waveguide architecture and fabrication method thereof, having an amorphous silicon (a-Si) core region bounded by polycrystalline silicon (p-Si) cladding regions for operation over the spectral range spanning the communication wavelength bands in the range from about 1.2 to about 1.6 microns. In this spectral region, the optical refractive index of a-Si is up to about 20% greater than p-Si, with the amorphous phase having the larger index, $n_a \approx 4$, and the crystalline phase the lower refractive index $n_c \approx 3.2$. Such an index differential enables waveguide operation, i.e. optical signal propagation through the higher refractive index a-Si core as bounded by the lower refractive index p-Si cladding.

Figure 2:
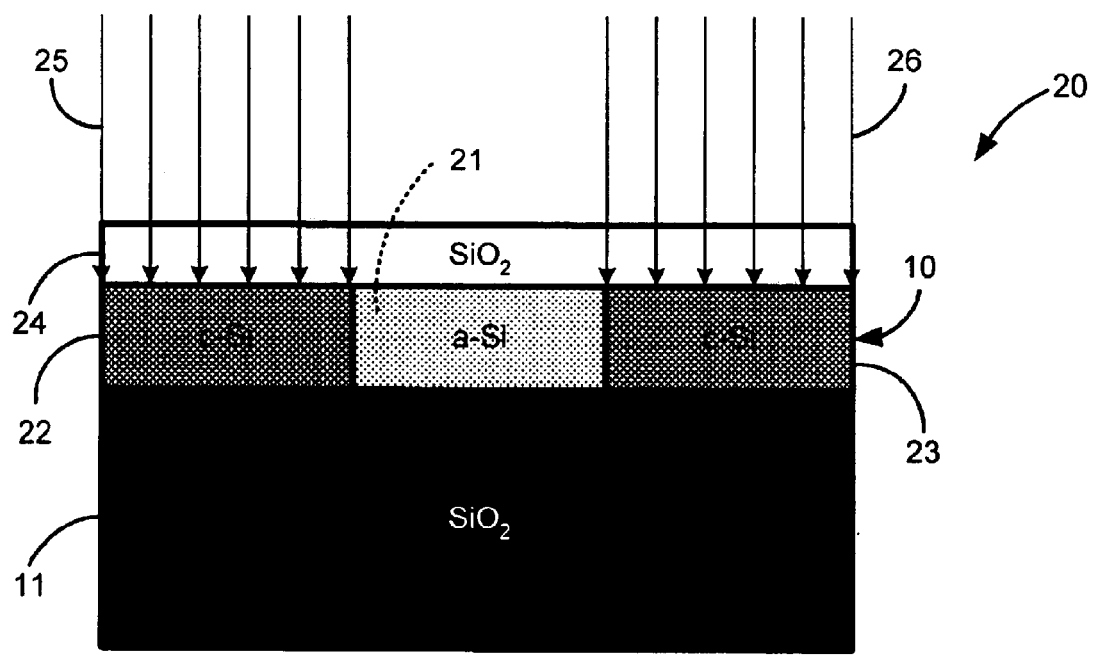
FIG. 2 is a cross-sectional view of the completed exemplary embodiment of the waveguide architecture after cladding region crystallization.

FIG. 2, shows an exemplary embodiment of the waveguide architecture of the present invention, generally indicated at 20, and having an intermediate silicon (Si) layer 10 formed (such as by thin film deposition) between a lower substrate 11 and an upper capping layer 24. The silicon layer 10 has an a-Si core region 21 and p-Si cladding regions 22 and 23 bounding the core on opposite sides. It is appreciated that while the silicon layer 10 is shown divided into only three regions (cladding, core, cladding) to form a single waveguide, additional waveguides may also be formed from the silicon, layer by the formation of additional cladding and core regions in alternating arrangement using the fabrication method of the present invention. Thus the ratio of non-selected regions to selected regions can be generally expressed as n:(n+1), where n is a counting number (i.e. 1, 2, 3, . . . ). In any case, both the substrate 11 and capping layer 24 preferably contain a dielectric material, such as for example $SiO_2$, to function as boundaries due to the lower refractive index of $SiO_2$ relative to the a-Si core region. In some instances the upper capping layer 24 may not be utilized for the waveguide 20, depending on the application, since air has a lower index of refraction than a-Si. And the substrate 11 may be a $SiO_2$ wafer or a low refractive index overlayer (such as an $SiO_2$ thin film) on a semiconductor wafer containing pre-fabricated electronic and photonic components that require optical interconnects. This waveguide architecture may be employed to provide the optical interconnect structure for photonic circuit elements in, for example, GaAs, GaAlAs, InP, and InGaAsP based materials.

Figure 1:
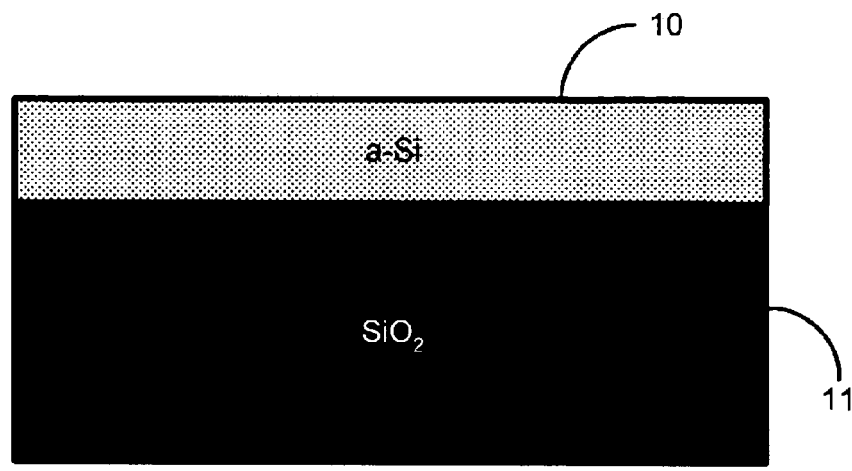
FIG. 1 is a cross-sectional view of an exemplary embodiment of the waveguide architecture under construction, and in particular after a-Si deposition on a substrate.

FIGS. 1 and 2 generally illustrate the direct patterning process for fabricating the waveguide architecture 20 of the present invention. As shown in FIG. 1, the first step involves the deposition of an amorphous silicon thin film layer 10 on the substrate 11 utilizing a thin film deposition process. Low temperature Si deposition characteristically results in the deposition of a-Si material, and various deposition processes may be utilized, including for example, physical vapor deposition (PVD), chemical vapor deposition (CVD), plasma-enhanced chemical vapor deposition (PECVD), ion beam deposition (IBD), etc. In any case, the deposition step produces a uniform homogeneous a-Si layer 10. And as shown in FIG. 2, the deposition of the a-Si layer 10 may be followed by formation of a capping layer 24, which is preferably a dielectric such as $SiO_2$. Similar to the a-Si layer, the capping layer 24 may be formed using a thin film deposition technique. In this manner, an article having a layered construction is produced and ready for further processing.

Following the thin film deposition of a-Si, a spatially-controllable, direct patterning technique is utilized to crystallize selected areas of the as-deposited a-Si layer into cladding regions, e.g. 22, 23, with non-selected areas of the a-Si layer crystallization remaining as uncrystallized core regions, e.g. 21, in alternating arrangement. Crystallization of a-Si is typically achieved via an annealing process that lowers the refractive index of the selected/cladding regions below that of the non-selected/core region(s) due to the dependence of the refractive index on the annealing conditions, i.e. it decreases with increased annealing temperature. And the refractive index reduction of the crystallized selected regions occurs at least over the wavelength range between about 1.2 and 1.6 microns, such that waveguide operation is enabled in that range. In FIG. 2, selected regions 22 and 23 are shown targeted using a crystallization technique represented by first 25 and second 26 sets of arrows, respectively, with the first set 25 operating to anneal and thereby form the p-Si cladding region 22 and the second set 26 operating to anneal and thereby form the p-Si cladding region 23. As indicated in FIG. 2, the a-Si crystallizing step may be performed after formation of the $SiO_2$ capping layer 24 since $SiO_2$ is transparent to the wavelengths utilized for laser-annealing. In the alternative, select area crystallization may be undertaken prior to formation of the $SiO_2$ capping layer, or as previously discussed, the upper capping layer 24 may not be utilized altogether.

A spatially controllable, pulsed laser system is preferably used to provide the selected area crystallization of the a-Si film so as to anneal and thereby transform silicon from the amorphous phase to the crystalline phase. It is appreciated, however, that other techniques may be utilized to provide selected area crystallization of the a-Si film, such as electron beam recrystallization, ion-beam induced crystallization, and metal induced recrystallization. A short wavelength laser is preferably utilized to scan the a-Si film and for a sufficient duration to heat the a-Si film to the melting temperature. Upon cooling, the melted film is recrystallized into a poly-crystalline morphology. To minimize heating of the substrate and the surrounding regions/materials, the laser wavelength should be strongly absorbed by silicon (wavelength less than about 600 nm), and the laser pulse duration should be less than about 100 nsec. For example, a pulsed laser is preferably utilized such as an excimer laser operating at about 300 nm. Alternatively, a frequency doubled, tripled or quadrupled Nd:YAG laser, or the equivalent, could be used. In any case, the laser fluence and pulse duration may be adjusted to perform the recrystallization and minimize local heating. Changing the laser fluence impinging on the film can modulate the refractive index change, and therefore control and set the refractive index to desired values. In this manner, such directionally controlled crystallization methods may be used to define waveguides of different lengths and widths on a-Si. The working principle relies on shaping the laser energy profile that is irradiated on the a-Si sample in order to obtain uniform guiding structures. However, grain uniformity is less critical since the waveguide core, where the light is confined and propagated, occurs in the a-Si and not in the annealed sections. Nonetheless, control still needs to be maintained in the waveguide sidewalls where the grain boundaries exist since waveguide loss can be affected due to scattering.

Figure 3:
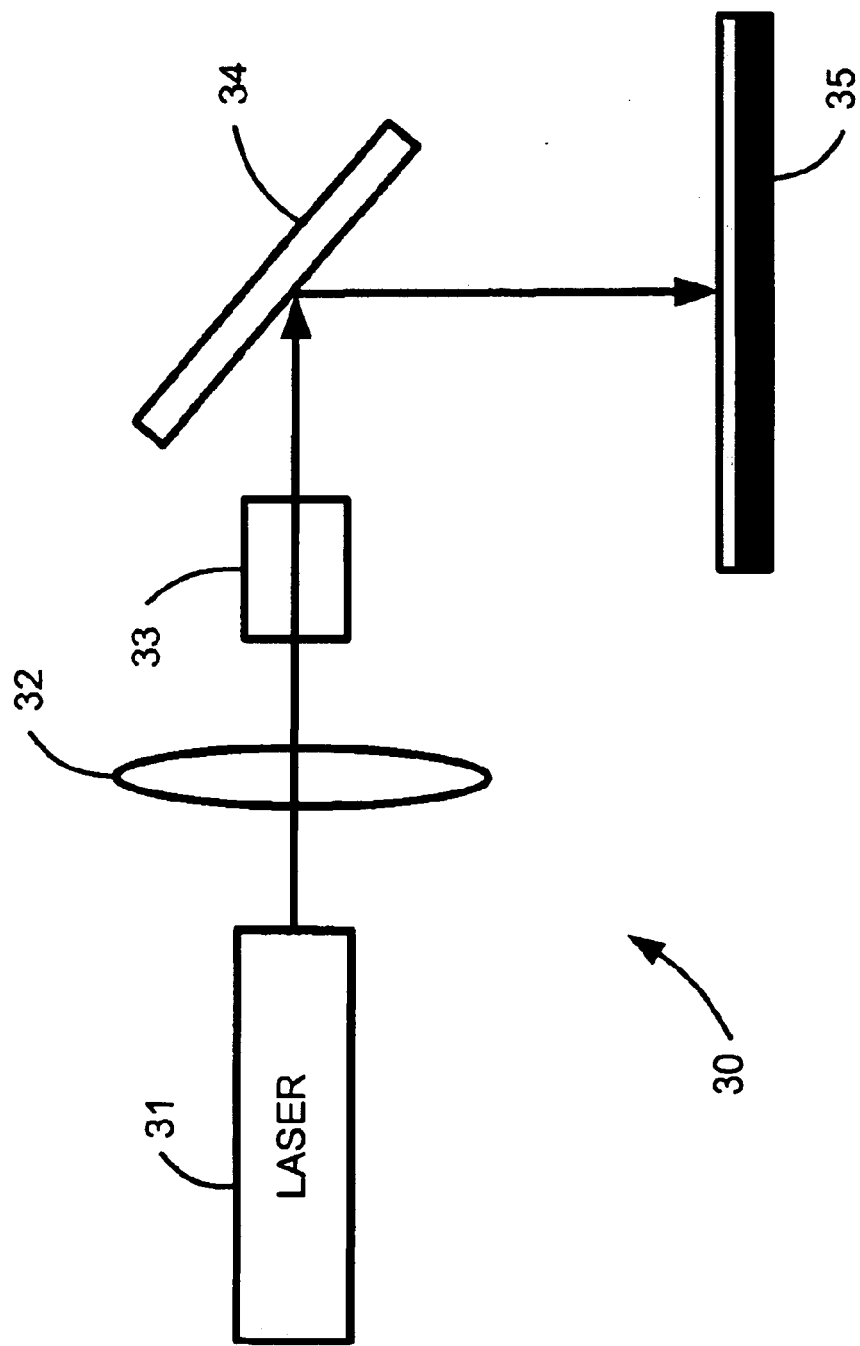
FIG. 3 is a schematic view of a first exemplary direct writing technique utilized for crystallizing the cladding regions of the waveguide architecture of the present invention.

The selected area laser crystallization process may be accomplished utilizing, for example, direct write, 1× projection or reduction imaging to directionally control and define the cladding regions. FIG. 3 illustrates a first preferred embodiment of a laser recrystallization system utilizing a direct write technique, and generally indicated at reference character 30. As shown, a laser 31 generates a beam that passes through a first optical system 32 that formats the beam for acceptance by a scanning module 33. The scanning module 33 is arranged to raster the beam in at least a direction transverse to the propagation direction. A second optical system 34 is arranged to reflect the rastered beam off a turning mirror and focus the rastered beam onto the a-Si surface of an article 35 to be patterned. The rastering may be accomplished using an acousto-optic deflector, polygonal mirror or similar device. The a-Si film and substrate 35 may be fixed to, for example, a movable substrate stage (not shown) which employs a combination of substrate motions, including translation and rotation, and beam rastering to move the laser beam over the totality of the a-Si film. In a preferred embodiment a pulsed, high fluence, short wavelength laser is employed such as an excimer laser or a frequency tripled Nd:YAG laser, but any short wavelength laser pulsed or CW (continuous wave) may be employed.

Figure 4:
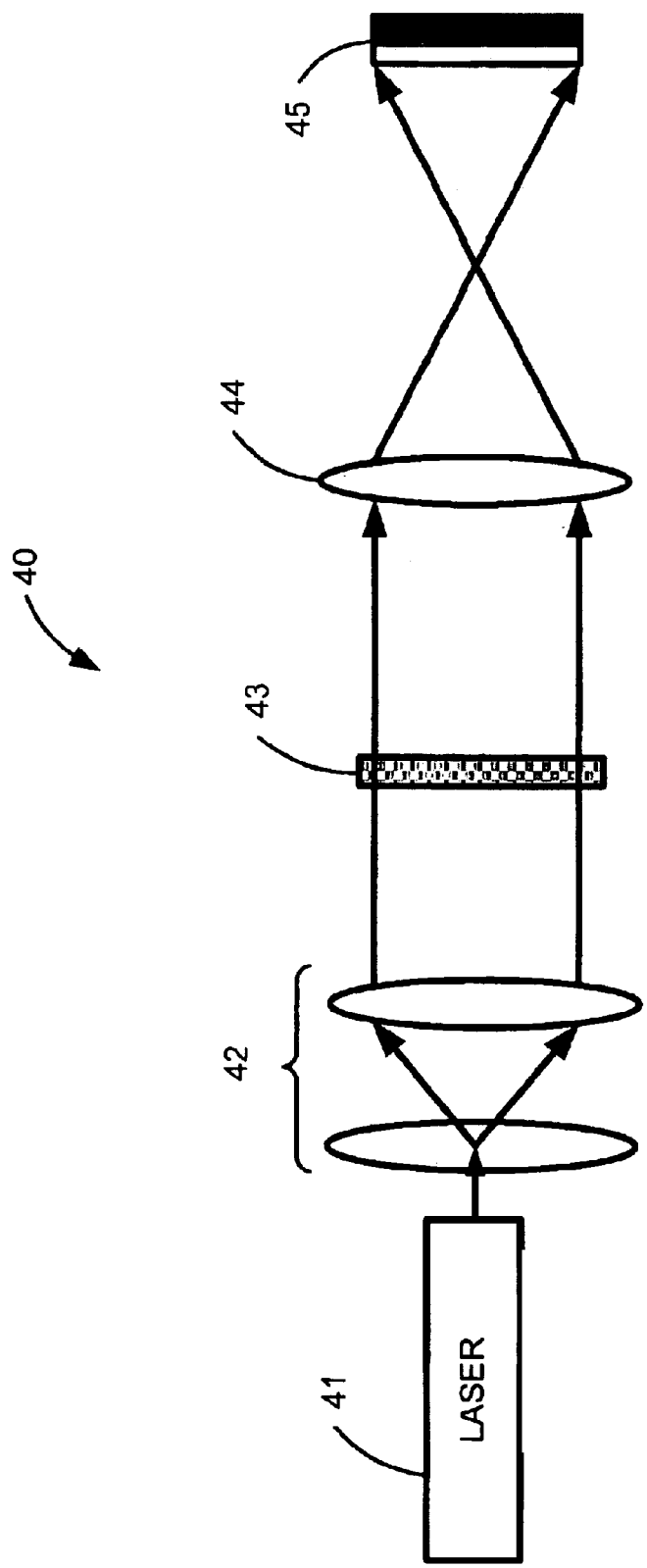
FIG. 4 is a schematic view of a second exemplary 1-x imaging technique utilized for crystallizing the cladding regions of the waveguide architecture of the present invention.

FIG. 4 illustrates a second preferred embodiment of a laser recrystallization process employing 1× projection imaging, and generally indicated at reference character 40. A laser 41 generates a beam that passes through a first optical system 42 arranged to expand and collimate the beam. The collimated beam is transmitted through a mask 43 that contains the master pattern to be projected onto the a-Si film at 45. Regions on the mask that correspond to selected regions of the film for crystallization are substantially transparent to the laser radiation, and regions of the mask corresponding to non-selected regions of the film not for crystallization are substantially opaque to the laser radiation. A second optical system 44 accepts the transmitted laser light and produces an image, at unit magnification, of the mask at the a-Si film surface 45. In a preferred embodiment a pulsed, high fluence, short wavelength laser is employed such as an excimer laser or a frequency tripled Nd:YAG laser. In an alternative "proximity print" arrangement, not shown, the second optical system is not utilized, and the mask is placed parallel to and in close proximity to the a-Si film. In this arrangement transmitted collimated light is utilized to directly recrystallize selected areas of the a-Si film.

Figure 5:
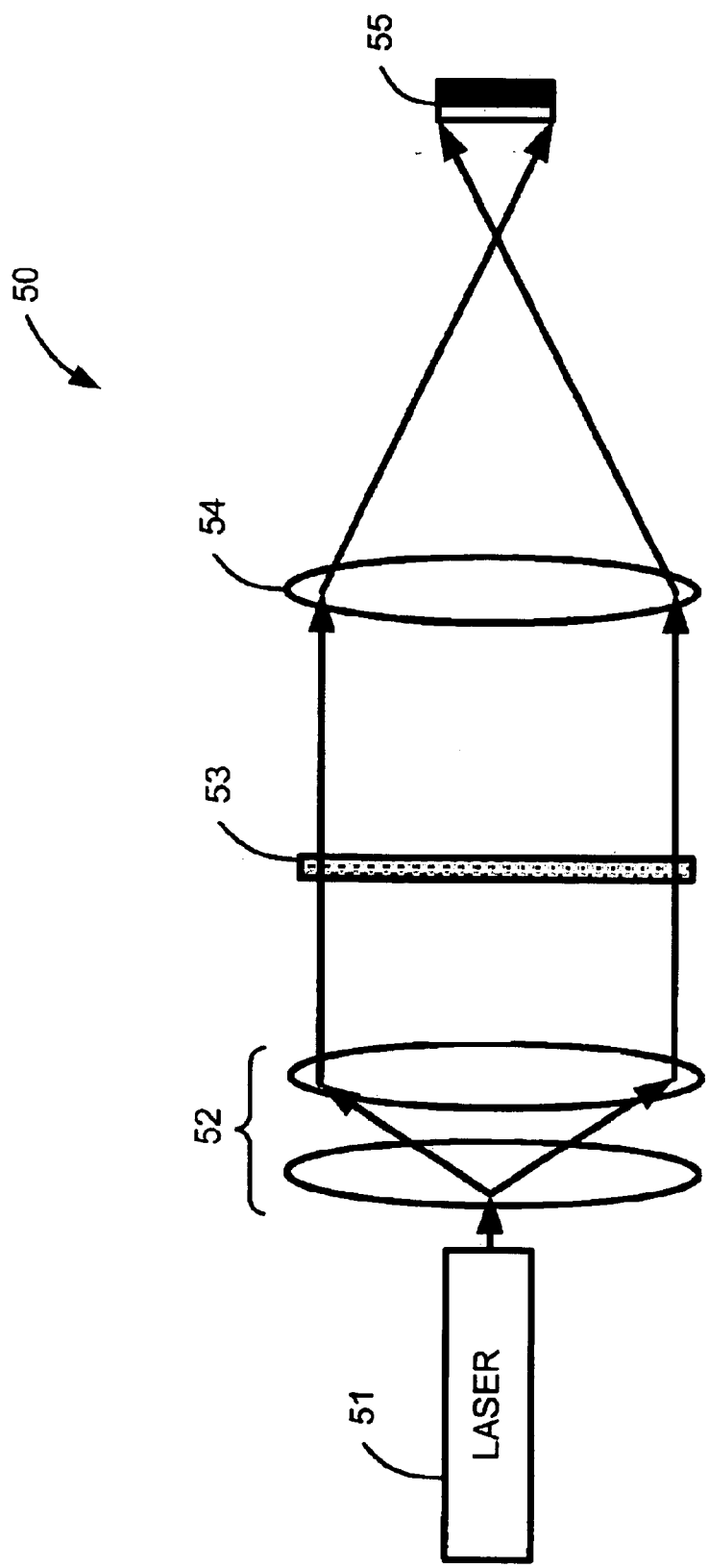
FIG. 5 is a schematic view of a third exemplary reduction imaging technique utilized for crystallizing the cladding regions of the waveguide architecture of the present invention.

FIG. 5 illustrates a third embodiment of a laser recrystallization system employing reduction imaging, and generally indicated at reference character 50. A laser 51 generates a beam that passes through a first optical system 52 arranged to expand and collimate the beam. The collimated beam is transmitted through a mask 53 that contains the master pattern to be projected onto the a-Si film of the article 55 to be patterned. Regions on the mask that correspond to crystalline regions of the film are substantially transparent to the laser radiation; regions of the mask that correspond to unrecrystallized regions of the film are substantially opaque to the laser radiation. A second optical system 54 accepts the transmitted laser light and produces a de-magnified image of the mask at the a-Si film surface. In a preferred embodiment a pulsed, high fluence, short wavelength laser is employed such as an excimer laser or a frequency tripled Nd:YAG laser. The a-Si film and substrate 55 are fixed to a movable translation stage so that multiple die on a single wafer may be processed using a "step and repeat" method.

Ideally the proximity print and projection approaches discussed above employ lasers of sufficient power that the entire exposed field can be processed with a small number of laser pulses. Where this is not possible the processed area can be reduced. This permits the use of lower cost lower power lasers. In this way a small portion of the full field, i.e. a tile, is exposed at a given time. The beam is then moved to the next tile and the remaining portions of the unexposed wafer are processed sequentially until the full field has been processed.

From experimental results of an a-Si sample subjected to laser crystallization, conducted by Applicants in research associated with the Lawrence Livermore National Laboratory, the formation of waveguides is clearly observed with fairly smooth sidewalls. The variation of the deposited a-Si refractive index with the deposition parameters allows the fabrication of very high-index step waveguides, which makes it very appealing, for example, for sharp bends and therefore high density optical interconnects. This architecture has the advantage that the core is a homogeneous as-deposited amorphous material, unaltered by post-deposition processing for influencing the refractive index, and therefore should minimize transmission losses arising from optical scattering. Additionally, means other than traditional photolithographic techniques may be utilized which conventionally form the core and cladding by layered deposition, which consequently accelerates the process and makes it more cost efficient. And the direct patterning process of the present invention avoids the need for bonding separate components together, such as for example, with silica glue, phosphate glue, epoxy polymer of diffusion bonding. The absence of such bonding, i.e. bonds or seams between the crystallized and non-crystallized regions, also precludes any type of surface figuring between-bonded layers to achieve a level of flatness (e.g. λ/20 wave flatness) prior to bonding in order to minimize losses at the bonds.

The foregoing is illustrative of the present invention and is not to be construed as limiting thereof. The invention is defined by the following claims, with equivalents of the claims to be included therein.

We claim:

1. A method of fabricating an optical waveguide comprising:
   depositing an amorphous silicon film on a substrate; and
   crystallizing selected regions of the amorphous silicon film to bound at least one non-selected region of the amorphous silicon film between the crystallized selected regions in alternating arrangement, wherein the crystallization reduces the refractive index of the selected regions below the refractive index of the at least one non-selected region.

2. The method of claim 1,
   wherein the selected regions are crystallized by laser recrystallization using a pulsed laser.

3. The method of claim 2,
   wherein the laser recrystallization utilizes a direct patterning technique selected from the group consisting of direct write, 1× projection imaging, and reduction imaging.

4. The method of claim 2,
   further comprising controlling the laser to shape the energy profile irradiated on the amorphous silicon film so as to crystallize the selected regions into uniform guiding structures.

5. The method of claim 2,
   further comprising controlling the laser to shape the energy profile irradiated on the amorphous silicon film so as to produce a desired boundary smoothness between the selected and non-selected regions.

6. The method of claim 2,
   wherein the laser wavelength is less than about 600 nm and the laser pulse duration is less than about 100 nsec, for minimizing heating of the substrate.

7. The method of claim 1,
   wherein the refractive index reduction of the crystallized selected regions occurs at least over the wavelength range between about 1.2 and about 1.6 microns.

8. The method of claim 7,
   wherein the refractive indices of the crystallized selected regions and the non-selected regions differ by up to about twenty percent.

9. The method of claim 1,
   further comprising capping the amorphous silicon film with a thin film capping layer.

10. An optical waveguide produced according to the method of claim 1,
    wherein the amorphous silicon film has a monolithic thin film construction without bonds or seams between the crystallized selected regions and the at least one non-selected region.

11. A method of direct patterning an optical waveguide from an amorphous silicon film comprising:
    spatially directing means for crystallizing amorphous silicon to crystallize selected regions of the amorphous silicon film on opposite sides of at least one non-selected region thereof so as to bound each non-selected region(s) between a pair of said crystallized selected regions in alternating arrangement, wherein said crystallization reduces the refractive index of the selected regions below the refractive index of the non-selected region(s).

12. The method of claim 11,
    wherein the amorphous silicon crystallization means is a pulsed laser capable of melting and recrystallizing silicon.

13. The method of claim 12,
    wherein the amorphous silicon crystallization means is directed to crystallize selected regions via a direct patterning technique selected from the group consisting of direct write, 1× projection imaging, and reduction imaging.

14. The method of claim 12,
    further comprising controlling the laser to shape the energy profile irradiated on the amorphous silicon film so as to crystallize the selected regions into uniform guiding structures.

15. The method of claim 12,
    further comprising controlling the laser to shape the energy profile irradiated on the amorphous silicon film so as to produce a desired boundary smoothness between the selected and non-selected regions.

16. The method of claim 12,
    wherein the laser wavelength is less than about 600 nm and the laser pulse duration is less than about 100 nsec, for minimizing heating.

17. The method of claim 11,
    wherein the refractive index reduction of the crystallized selected regions occurs at least over the wavelength range between about 1.2 and about 1.6 microns.

18. The method of claim 17,
    wherein the refractive indices of the crystallized selected regions and the non-selected regions differ by up to about twenty percent.

19. The method of claim 11,
    further comprising capping the amorphous silicon film with a thin film capping layer.

20. An optical waveguide produced according to the method of claim 11,
    wherein the amorphous silicon film has a monolithic thin film construction without bonds or seams between the crystallized selected regions and the at least one non-selected region.

21. An optical waveguide comprising:
    a monolithic structure having at least one as-deposited amorphous silicon (a-Si) core region, and at least one pair of annealed polycrystalline silicon (p-Si) cladding regions bounding the a-Si core region(s) on opposite sides thereof in alternating arrangement, said annealed p-Si cladding regions having a lower index of refraction than the a-Si core region(s).

22. The optical waveguide of claim 21,
    wherein the monolithic structure is a thin film.

23. The optical waveguide of claim 21,
    further comprising a substrate on which the monolithic structure is deposition formed, said substrate having a lower index of refraction than the a-Si core region(s).

24. The optical waveguide of claim 23,
    wherein the substrate comprises $SiO_2$.

25. The optical waveguide of claim 23,
    further comprising a thin film capping layer sandwiching the monolithic structure between the thin film capping layer and the substrate.

26. The optical waveguide of claim 21,
wherein the lower refractive index of the annealed p-Si cladding regions enable waveguide operation in the wavelength range of about 1.2 and about 1.6 microns.

27. The optical waveguide of claim 26,
wherein the refractive indices of the annealed p-Si cladding and a-Si core regions differ by up to about twenty percent.

28. A patterned optical waveguide comprising:
a bondless and seamless monolithic thin film structure having n amorphous silicon core region(s) and n+1 crystallized silicon cladding regions laser patterned in alternating arrangement with respect to the amorphous silicon core region(s), with said cladding regions having a lower refractive index than the amorphous silicon core region(s).

29. The patterned optical waveguide of claim 28,
further comprising a substrate on which the monolithic thin film structure is deposition formed, said substrate having a lower index of refraction than the amorphous silicon core region(s).

30. The patterned optical waveguide of claim 29,
wherein the substrate comprises $SiO_2$.

31. The patterned optical waveguide of claim 29,
further comprising a thin film capping layer sandwiching the amorphous silicon core region(s) between the thin film capping layer and the substrate.

32. The optical waveguide of claim 28,
wherein the lower refractive index of the crystallized silicon cladding regions enable waveguide operation in the wavelength range of about 1.2 and about 1.6 microns.

33. The optical waveguide of claim 32,
wherein the refractive indices of the crystallized silicon cladding regions and the amorphous silicon core region(s) differ by up to about twenty percent.

* * * * *